United States Patent
Zhao et al.

(10) Patent No.: US 11,936,777 B2
(45) Date of Patent: Mar. 19, 2024

(54) METHOD, DEVICE OF SECRET-KEY PROVISIONING AND COMPUTER-READABLE STORAGE MEDIUM THEREOF

(71) Applicant: Beijing University of Posts and Telecommunications, Beijing (CN)

(72) Inventors: Yongli Zhao, Beijing (CN); Hua Wang, Beijing (CN); Xiaosong Yu, Beijing (CN); Xinyi He, Beijing (CN); Yajie Li, Beijing (CN); Jie Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 228 days.

(21) Appl. No.: 16/739,369

(22) Filed: Jan. 10, 2020

(65) Prior Publication Data
US 2020/0358598 A1 Nov. 12, 2020

(30) Foreign Application Priority Data

May 8, 2019 (CN) .......................... 201910380711.9

(51) Int. Cl.
*H04L 9/08* (2006.01)
*H04L 9/30* (2006.01)
(52) U.S. Cl.
CPC ............ *H04L 9/083* (2013.01); *H04L 9/0822* (2013.01); *H04L 9/0891* (2013.01); *H04L 9/3073* (2013.01)

(58) Field of Classification Search
CPC ..... H04L 9/083; H04L 9/0822; H04L 9/0891; H04L 9/3073; H04L 9/0852
See application file for complete search history.

(56) References Cited

U.S. PATENT DOCUMENTS

| | | | |
|---|---|---|---|
| 7,114,156 B2* | 9/2006 | Le | G06F 9/5038 718/103 |
| 7,301,968 B2* | 11/2007 | Haran | H04Q 11/0067 370/508 |
| 10,491,576 B1* | 11/2019 | Pfannenschmidt | H04L 63/061 |
| 2002/0196801 A1* | 12/2002 | Haran | H04Q 11/0067 370/519 |

(Continued)

FOREIGN PATENT DOCUMENTS

| | | |
|---|---|---|
| CN | 105357001 A | 2/2016 |
| CN | 106878006 A | 6/2017 |

(Continued)

OTHER PUBLICATIONS

Cao et al., Time-Scheduled Quantum Key Distribution (QKD) Over WDM Networks, Journal of Lightwave Technology, vol. 36, No. 16, pp. 3382-3395, dated Aug. 15, 2018.

(Continued)

*Primary Examiner* — Oleg Korsak
(74) *Attorney, Agent, or Firm* — Westbridge IP LLC

(57) ABSTRACT

Disclosed is a secret-key provisioning (SKP) method and device based on an optical line terminal (OLT), which can generate an SKP queue according to key requests received; generate at least one secret-key according to the SKP queue; and store the at least one secret-key in key pools (KPs) of corresponding ONUS. A non-transitory computer-readable storage medium is also disclosed.

17 Claims, 5 Drawing Sheets

(56) References Cited

U.S. PATENT DOCUMENTS

| | | | | |
|---|---|---|---|---|
| 2003/0012385 A1* | 1/2003 | Saito | .................. | H04N 21/4627 |
| | | | | 348/E7.056 |
| 2003/0144963 A1* | 7/2003 | Saito | .................. | H04N 21/2351 |
| | | | | 348/E7.056 |
| 2005/0008158 A1* | 1/2005 | Huh | ..................... | H04L 9/0891 |
| | | | | 380/256 |
| 2005/0190912 A1* | 9/2005 | Hopkins | ............... | H04L 9/3033 |
| | | | | 380/44 |
| 2005/0195975 A1* | 9/2005 | Kawakita | ............. | H04L 9/3236 |
| | | | | 380/30 |
| 2005/0213768 A1* | 9/2005 | Durham | ................ | H04L 63/062 |
| | | | | 380/278 |
| 2006/0129814 A1* | 6/2006 | Eun | ...................... | H04L 9/3236 |
| | | | | 713/168 |
| 2007/0133798 A1* | 6/2007 | Elliott | .................... | H04B 10/70 |
| | | | | 398/189 |
| 2007/0133800 A1* | 6/2007 | Kim | .................... | H04L 63/0428 |
| | | | | 380/256 |
| 2007/0201698 A1* | 8/2007 | Huh | ..................... | H04L 63/061 |
| | | | | 380/256 |
| 2007/0230702 A1* | 10/2007 | Puri | .................. | H04W 12/0431 |
| | | | | 380/270 |
| 2009/0034733 A1* | 2/2009 | Raman | .................... | H04L 9/083 |
| | | | | 380/277 |
| 2009/0086977 A1* | 4/2009 | Berggren | .............. | H04L 9/3263 |
| | | | | 380/279 |
| 2009/0282246 A1* | 11/2009 | Gunther | ................ | H04L 63/062 |
| | | | | 713/168 |
| 2009/0316910 A1* | 12/2009 | Maeda | .................... | H04L 9/083 |
| | | | | 380/279 |
| 2010/0202612 A1* | 8/2010 | Nema | ...................... | H04L 63/068 |
| | | | | 398/58 |
| 2010/0208893 A1* | 8/2010 | Toyoshima | ........... | H04L 9/0858 |
| | | | | 380/256 |
| 2011/0302190 A1* | 12/2011 | Young | .................... | G06F 15/177 |
| | | | | 707/769 |
| 2013/0051559 A1* | 2/2013 | Baba | ...................... | H04L 9/083 |
| | | | | 380/279 |
| 2013/0054967 A1* | 2/2013 | Davoust | ................ | H04L 63/062 |
| | | | | 713/168 |
| 2013/0230326 A1* | 9/2013 | Hu | ......................... | H04B 10/07 |
| | | | | 398/67 |
| 2014/0040149 A1* | 2/2014 | Fiske | ................. | G06Q 20/3263 |
| | | | | 705/71 |
| 2016/0234018 A1* | 8/2016 | Frohlich | ................ | H04B 10/70 |
| 2017/0237558 A1* | 8/2017 | Yuan | ..................... | H04L 9/0852 |
| | | | | 380/279 |
| 2018/0019988 A1* | 1/2018 | Li | ........................... | H04L 63/205 |
| 2018/0234237 A1* | 8/2018 | Ye | .......................... | H04L 9/0891 |
| 2018/0287785 A1* | 10/2018 | Pfannenschmidt | ... | H04L 9/0822 |
| 2018/0332373 A1* | 11/2018 | Wey | ....................... | H04J 14/0238 |
| 2019/0228174 A1* | 7/2019 | Withrow | ................ | H04L 9/3213 |
| 2019/0260581 A1* | 8/2019 | Su | .......................... | H04L 9/0855 |
| 2020/0042349 A1* | 2/2020 | Jain | ......................... | G06F 9/546 |
| 2022/0029729 A1* | 1/2022 | Guo | ......................... | H04B 10/70 |

FOREIGN PATENT DOCUMENTS

| | | |
|---|---|---|
| CN | 106961327 A | 7/2017 |
| CN | 108023725 A | 5/2018 |

OTHER PUBLICATIONS

First Office Action issued in counterpart Chinese Patent Application No. 201910380711.9, dated Apr. 1, 2020.

Second Office Action issued in counterpart Chinese Patent Application No. 201910380711.9, dated Dec. 18, 2020.

\* cited by examiner

METHOD, DEVICE OF SECRET-KEY PROVISIONING AND COMPUTER-READABLE STORAGE MEDIUM THEREOF

CROSS-REFERENCE TO RELATED APPLICATIONS

The application claims priority of Chinese patent application CN201910380711.9, filed on May 8, 2019, the entire contents of which are incorporated herein by reference.

TECHNICAL FIELD

The disclosure relates to communication technology, in particular to a method and a device of secret-key provisioning (SKP) among a plurality of final users. Moreover, a computer-readable storage medium is also disclosed.

BACKGROUND

Data traffic in access networks may be provided through metro networks and core networks to the other access networks in practical area.

However, with the development of network technologies, communication data between final users becomes more and more sensitive, thus the security requirements become much higher.

Quantum Key Distribution (QKD) can provide theoretical-secure keys for final users or customers. Motivated by this, various schemes were developed to integrate QKD in traditional access networks to guarantee the secure communication of multiple final users. Referred by existing studies, the integration of QKD in traditional access networks can be called QKD-secured access network (QAN).

Traditional access network always manages and controls final user requests through local optical line terminal (OLT). While great pressure on communication security will strongly challenge the process of application aggregation and data broadcasting in traditional access networks. The integration of QKD in traditional access networks (also called QAN) can generate and provide secret-keys for the data transmission between OLT and optical network units (ONUs). However, the volume of secret-keys generated by real-time QKD cannot fully serve the requirements of final user. Therefore, an efficient and flexible way to provide secret-keys is important for multi-users in QAN.

SUMMARY

Examples of the present disclosure provide a method and a device of SKP for final users, to provide secret-keys for multiple final users in an efficient and flexible way.

According to some examples of the present disclosure, the method of SKP for final users may include: generating an SKP queue according to at least one key request received; generating at least one secret-key according to the SKP queue; and storing the at least one secret-key in key pools (KPs) in the side of corresponding ONUs.

According to some examples of the present disclosure, a key request may include the source node of the key request, the destination node of the key request, the quantity of secret-keys required, and the level of a corresponding user request.

According to some examples of the present disclosure, generating an SKP queue according to at least one key request received may further include: determining the level of each key request according to the level of the corresponding user request and whether the key request can be paired with another key request; generating the SKP queue according to the level of each key request; and obtaining the quantity of secret-keys to be provisioned for each key request.

According to some examples of the present disclosure, obtaining the quantity of secret-keys to be provisioned for each key request may include: for each key request, determining the quantity of keys in the KP in the ONU which sends the key request, and determining the quantity of secret-keys to be provisioned according to the difference between the quantity of secret-keys required and the quantity of secret-keys in the KP.

According to some examples of the present disclosure, generating at least one secret-key according to the SKP queue may include: generating a key request period for each key request according to the quantity of secret-keys to be provisioned; configuring an SKP period according to the SKP queue and the key request period of each key request; and generating at least one secret-key according to the SKP queue in the SKP period.

According to some examples of the present disclosure, generating a key request period for each key request according to the quantity of secret-keys to be provisioned may include: generating a key request pair when any two key requests with a high level can be paired, adding the quantity of keys required by the two key requests of each key request pair and taking the summation as the quantity of secret-keys required by the key request pair; determining the quantity of secret-keys that can be generated in one time slot; calculating the quantity of time slots required by each key request according to the ratio of the quantity of secret-keys to be provisioned for each key request and the quantity of secret-keys that can be generated in one time slot; and generating a key request period for each key request according to the quantity of time slots required by the key request.

According to some examples of the present disclosure, configuring an SKP period according to the SKP queue and the key request period of each key request may include: determining the quantity of time slots required by all the key requests; extracting time slots according to the quantity determined; dividing the time slots exacted according to the order of the key requests in the key request queue and the key request period of each key request; and allocating the time slots divided to each key request.

According to some examples of the present disclosure, generating at least one secret-key according to the SKP queue in the SKP period may include: generating secret-keys for each key request in the time slots allocated to the key request.

According to some examples of the present disclosure, the method may further include: when a secured communication between a source node and a destination node starts, taking, by the source node, a secret-key from the KP configured in the source node to encrypt the data; and taking, by the destination node, the secret-key from the KP configured in the destination node to decrypt the data encrypted.

According to some examples of the present disclosure, the method may further include: inquiring whether any key request needs to be updated; when a key request needs to be updated, receiving an updated key request; and when there is no key request needs to be updated, deleting the allocation of the time slots in the next SKP period.

According to some examples of the present disclosure, the key request is received from an ONU when the ONU detects that the quantity of secret-keys in the KP is less than the SKP threshold of the KP.

According to some examples of the present disclosure, the method of SKP for final users may include: sending, by each of multiple ONUs, a key request to an OLT when the ONU receives a user request; generating, by the OLT, an SKP queue according to key requests received from the multiple ONUs; generating, by the OLT, secret-keys according to the SKP queue; and storing, by the OLT, the secret-keys in key pools KPs in the side of corresponding ONUs.

According to some examples of the present disclosure, the method of SKP may further include: inquiring, by the OLT, whether any key request needs to be updated; when a key request needs to be updated, sending, by the ONU, an updated key request to the OLT; and when there is no key request needs to be updated, deleting, by the OLT, the allocation of the time slots in the next SKP period.

According to some examples of the present disclosure, the method of SKP may further include: checking, by the ONU, the quantity of secret-keys in the KP after receiving a user request; determining, by the ONU, to send the key request to the OLT when the quantity of secret-keys in the KP is less than an SKP threshold of the KP.

According to some examples of the present disclosure, the device of SKP may include: one or more processors, one or more memories, and a communication bus configured to couple the one or more processors and the one or more memories; wherein the one or more memories store one or more instructions, and when executed by the one or more processors, the instructions cause the one or more processors to perform the above method.

A non-transitory computer-readable storage medium is also disclosed, which may include one or more instructions, when executed by one or more processors, cause the one or more processors to perform the above method.

According to the method and device of SKP of the present disclosure, after receiving a plurality of key requests, an SKP queue may be generated according to the level of each key request received. Then, secret-keys may be generated according to the SKP queue, and stored in KPs in the side of corresponding ONUs. Finally, data may be encrypted/decrypted using the secret-key generated. Since the SKP queue is generated according to the level of each key request and secret-keys are generated according to the key request queue, not only a real-time SKP can be realized, but also the requirements on security of ONUs can be served. Moreover, a flexible SKP in the QAN can be realized by matching the time slots in the QAN and the requirements on secret-keys of the ONUs.

Furthermore, according to the present disclosure, the SKP queue is obtained by sorting the key requests according to the level of each key request. Therefore, a key request with a higher level will have a higher priority of getting the secret-keys, thus the efficiency of secret-key resources distribution can be improved.

DETAILED DESCRIPTION

More particular description of the disclosure will be rendered by reference to specific examples which are illustrated in the appended drawings.

Figure 1:
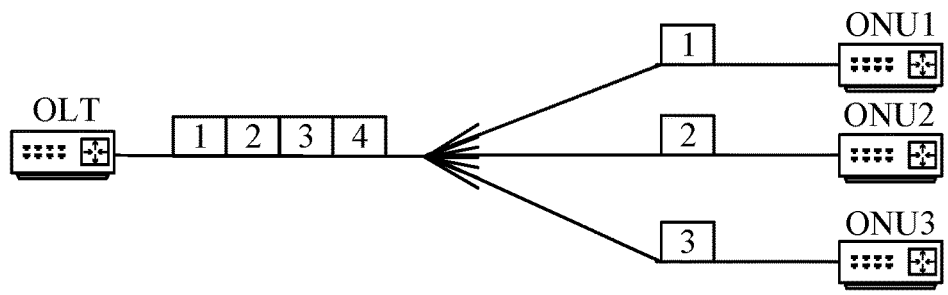
FIG. 1 is a schematic diagram illustrating the connections between OLT and ONUs in traditional access networks.

FIG. 1 is a schematic diagram illustrating the connections between OLT and ONUs in traditional access networks. As shown in FIG. 1, OLT is the crucial component of a traditional access network, which has the functions of service convergence, service security management, network configuration management and so on. As the types of services required by final users are exploring, the OLT needs to control and manage multiple ONUs. The OLT needs to collect user requests from the ONUs, forward the user requests to a superior network, and broadcast data obtained to all the ONUs, thereby data management and data control between the OLT and the ONUs can be realized.

Figure 2:
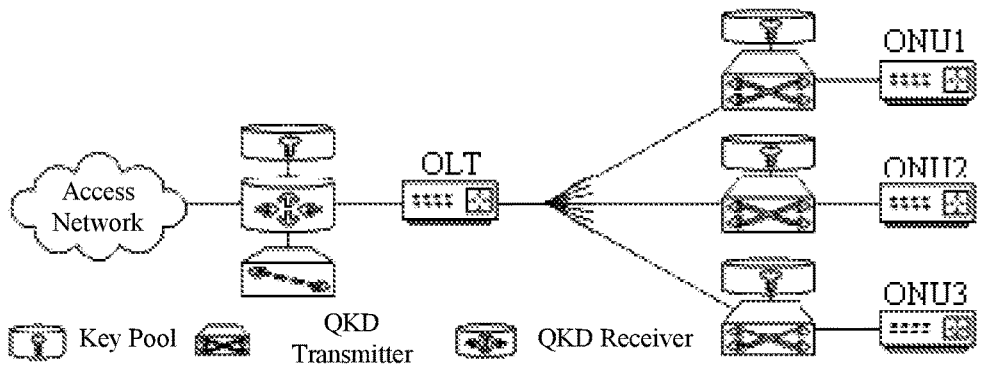
FIG. 2 is a schematic diagram illustrating the deployment of QKD devices in the QAN according to examples of the present disclosure.

FIG. 2 is a schematic diagram illustrating the deployment of QKD devices in the QAN according to examples of the present disclosure. According to FIG. 2, to serve the security requirements of data transmissions between the OLT and the ONUs, a QKD receiver may be arranged at the OLT, and a QKD transmitter may be arranged at each of the ONUs. In order to provide a secret-key to an ONU quickly, a KP need to be arranged at each QKD transmitter and each QKD receiver. A KP is used for storing the secret-keys generated. Meanwhile, in order to facilitate the generation of secret-keys among ONUs and save the cost at the same time, a trusted/quantum relay may be placed together with the QKD device at the OLT. As shown in FIG. 2, the QKD transmitter arranged at ONU1 and the QKD receiver arranged at the OLT may perform a QKD process through an optical fiber using technologies such as wavelength division multiplexing (WDM) or Time Division Multiplexing (TDM) to generate a secret-key between ONU1 and the OLT, and then the trusted/quantum relay located at the OLT may generate secret-keys between the ONUs. And these secret-keys generated may be stored in the KPs in both sides of the QKD transmitter and the QKD receiver.

It should be noted that FIG. 2 shows only one possible deployment of QKD devices. According to some other examples of the present disclosure, it is also possible to arrange a QKD transmitter at the OLT and arrange a QKD receiver at each of the ONUs. Alternatively, it is also possible to arrange both a QKD transmitter and a QKD receiver at the OLT and arrange both a QKD receiver and a QKD transmitter at each of the ONUs. It should be noted, in all these different deployments of the QKD devices, secret-keys can be generated between the OLT and each of the ONUs. The differences among the above deployments of the QKD devices would make no influence on the SKP method and the SKP device provided by the present disclosure. In addition, either WDM or TDM may be adopted by the QKD process implemented between the OLT and each of the ONUs.

Figure 3:
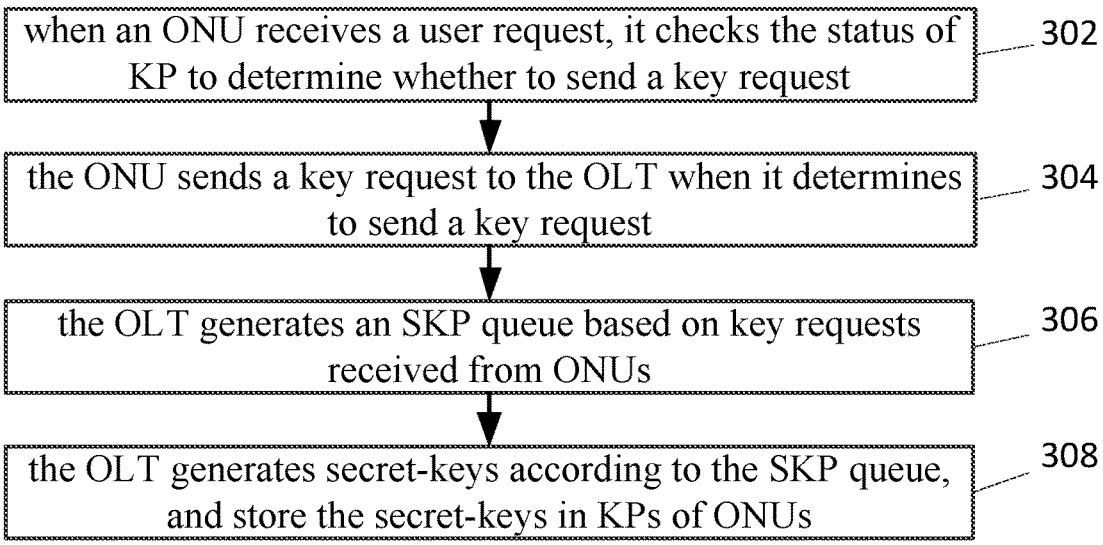
FIG. 3 is a flowchart illustrating the process of the SKP method according to examples of the present disclosure.

FIG. 3 is a flowchart illustrating the process of the SKP method according to examples of the present disclosure. The method may be implemented by the OLT and the ONUs. To achieve an on-demand SKP, a KP is set at each of the ONUs for caching the secret-keys generated. According to examples of the present disclosure, an ONU may also be referred to as a final user end or a final user. The KP corresponding to an ONU can be called as a final user end KP.

As shown in FIG. 3, the method may include:

In step 302, when an ONU receives a user request, it may check the status of the KP to determine whether to send a key request.

According to examples of the present disclosure, after receiving a user request, the ONU may further record the level of the user request. Wherein, the level of the user request may be a high level or a low level.

According to examples of the present disclosure, the step of the ONU determining whether to send a key request may include the following steps.

First, the ONU checks the quantity of secret-keys in the KP. Then, the ONU determines whether the quantity of secret-keys in the KP is less than an SKP threshold of the KP. Finally, if the quantity of secret-keys in the KP is less than the SKP threshold of the KP, the ONU determines to send a key request; or otherwise, the ONU determines not to send a key request. Then the ONU may continue to receive other user requests.

In step 304, the ONU may send a key request to the OLT when it determines to send a key request.

According to examples of the present disclosure, the key request may include the source node (the source ONU) of the key request, the destination node (the destination ONU) of the key request, the quantity of secret-keys required, and the level of a user request corresponding to the key request.

According to examples of the present disclosure, before sending a key request to the OLT, the ONU may further obtain the status of the QKD device deployed. If the QKD device is idle, the ONU may mark the QKD device as in an occupied state and then send the key request; or otherwise, the ONU may wait until the QKD device is idle and then send the key request.

In step 306, the OLT may generate an SKP queue based on one or more key requests received from the ONUs.

According to examples of the present disclosure, in the above step 306, the OLT may first obtain the source node and the destination node of each key request, the quantity of secret-keys required by each key request, and the level of user request corresponding to each key request. Then, the OLT may determine the level of each key request according to the level of its corresponding user request and whether the key request can be paired with another key request. Further, the OLT may generate an SKP queue according to the level of each key request. At last, the OLT may obtain the quantity of secret-keys to be provisioned for each key request according to the quantity of secret-keys required by each key request.

According to examples of the present disclosure, in the above step 306, the OLT may further generate a key request period for each key request according to the quantity of secret-keys to be provisioned for each key request; and then configure an SKP period according to the SKP queue and the key request period of each key request.

In step 308, the OLT may generate secret-keys according to the SKP queue, and store the secret-keys in KPs of ONUs corresponding to each key request.

According to examples of the present disclosure, in the above step 308, the OLT may trigger the QKD device at its side to generate secret-keys with corresponding QKD devices at ONUs according to the SKP queue.

After performing the above step 308, the process of SKP is completed.

After the process of SKP is completed, when a communication between any two of the ONUs starts, the source node (the source ONU) may take a secret-key from its KP to encrypt the data and the destination node (the destination ONU) may take the same secret-key from its KP to decrypt the data encrypted by the source node.

Further, according to examples of the present disclosure, the OLT may further broadcast to the ONUs to inquire whether an SKP is still needed. When an ONU determined that the secret-keys in its KP is still not enough, the ONU may send a new key request to the OLT. Then OLT may receive at least one new key request and return to the above step 306 to allocate secret-keys according to the at least one new key request received. When there is no key request received, the OLT may delete the allocation of time slots in the next SKP period.

Figure 4:
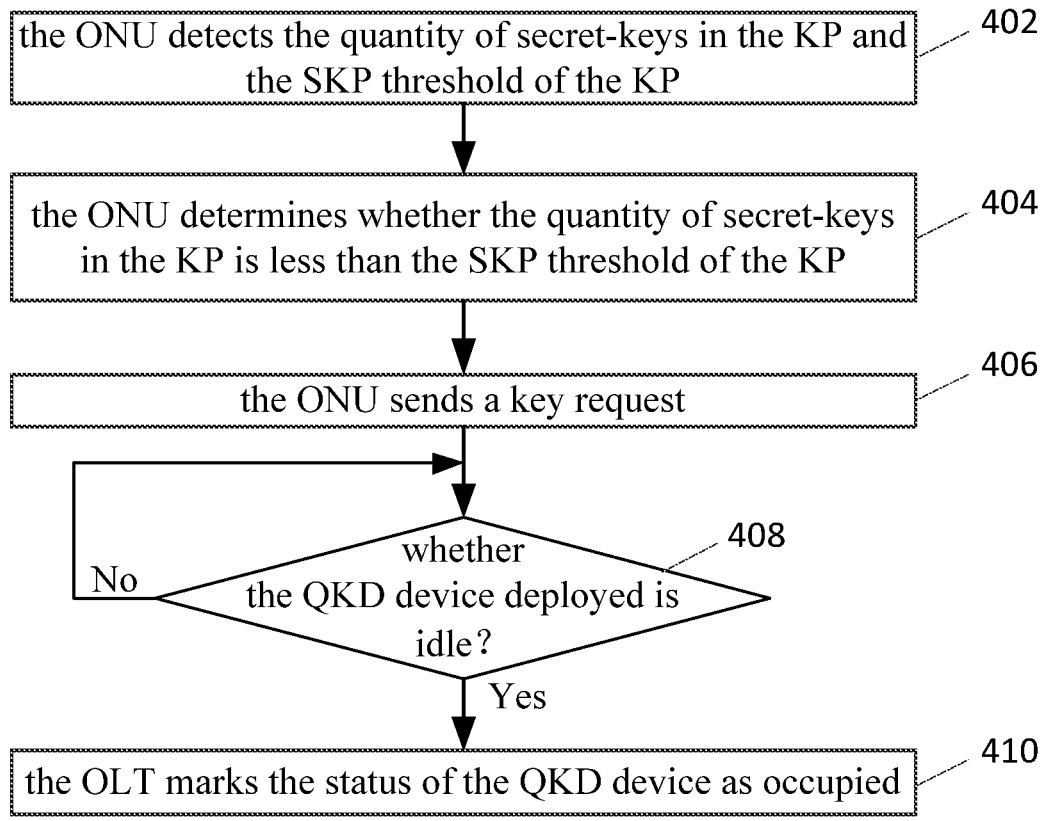
FIG. 4 is a flowchart illustrating the process of step 302 in the SKP method according to examples of the present disclosure.

FIG. 4 is a flowchart illustrating the process of the above step 302 in the SKP method according to examples of the present disclosure.

As shown in FIG. 4, the process of the above step 302 may include:

In step 402, after receiving a user request, the ONU may detect the quantity of secret-keys in the KP and the SKP threshold of the KP. The ONU may also record the level of the user request received.

According to examples of the present disclosure, the ONU may also detect the capacity of the KP.

According to examples of the present disclosure, the SKP threshold of the KP may be used for an early warning on SKP. That is, when the quantity of secret-keys in the KP is less than the SKP threshold of the KP, it means that an SKP is needed. Wherein, the level of a user request may be a high level or a low level.

In step 404, the ONU may determine whether the quantity of secret-keys in the KP is less than the SKP threshold of the KP.

When the quantity of secret-keys in the KP is less than the SKP threshold of the KP, proceed to step 406. When the quantity of secret-keys in the KP is not less than the SKP threshold of the KP, return to step 404.

In step 406, the ONU may determine to send a key request to the OLT when the quantity of secret-keys in the KP is less than the SKP threshold of the KP.

According to examples of the present disclosure, the key request may include the source node of the key request, the destination node of the key request, the quantity of secret-keys required and the level of the user request corresponding to the key request.

Figure 5:
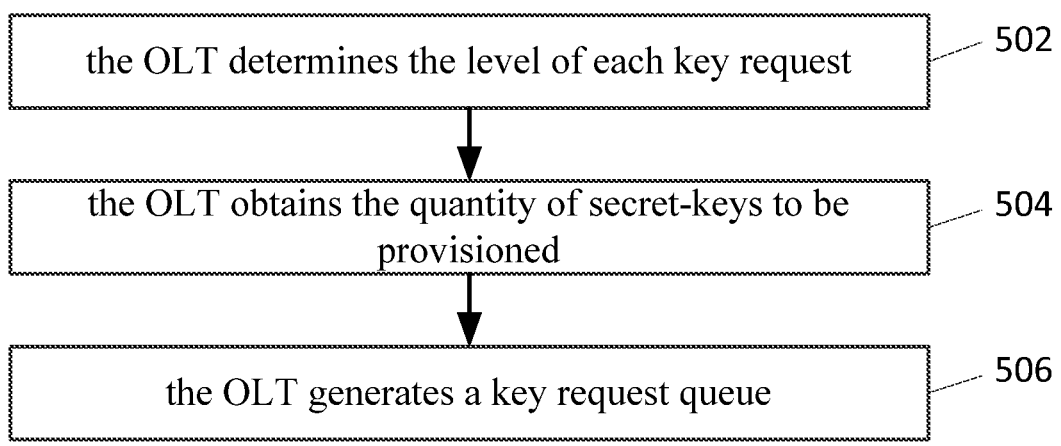
FIG. 5 is a flowchart illustrating the process of step 306 in the SKP method according to examples of the present disclosure.

FIG. 5 is a flowchart illustrating the process in step 306 in SKP method according to examples of the present disclosure. As shown in FIG. 5, the process of the above step 306 may include:

In step 502, the OLT may determine the level of each key request according to the level of its corresponding user request and whether the key request can be paired with another key request.

Wherein, according to examples of the present disclosure, the level of a user request is indicated in the key request received.

Whether the key request can be paired with another key request may be determined by determining whether there is another key request whose source node is the destination node of the key request and whose destination node is the source node of the key request. That is, if a key request can be paired with another key request, it means these two key requests can form a bidirectional key request. If a key request cannot be paired with another key request, it means this key request is a unidirectional key request.

Considering the level of the corresponding user request and whether the key request can be paired with another key request, the level of a key request may include the following four types (from the highest level to the lowest level):

Level 1, the level of the corresponding user request is high and the key request and another key request can form a bidirectional key request (the key request can be paired with another key request).

Level 2, the level of the corresponding user request is high and the key request is a unidirectional key request (the key request cannot be paired with another key request).

Level 3, the level of the corresponding user request is low and the key request and another key request can form a bidirectional key request (the key request can be paired with another key request).

Level 4, the level of the corresponding user request is low and the key request is a unidirectional key request (the key request cannot be paired with another key request).

In step 504, the OLT may obtain the quantity of secret-keys to be provisioned for each key request according to the quantity of secret-keys required by each key request.

According to examples of the present disclosure, services with security requirements in QANs are mostly randomly requested, therefore, secret-keys in different KPs are also randomly consumed. According to examples of the present disclosure, a KP of an ONU may trigger a key request while the quantity of secret-keys in the KP is less than the SKP threshold. According to examples of the present disclosure, the OLT may obtain the quantity of secret-keys in each of the KP by broadcasting an inquiry to the ONUs which send a key request. The OLT may determine the quantity of secret-keys to be provisioned for each key request according to the difference between the quantity of secret-keys required and the quantity of secret-keys in each KP.

In step 506, the OLT may generate a key request queue by sorting the key requests according to the level of each key request.

According to examples of the present disclosure, the OLT may generate a key request queue to store the key requests received from the ONUs and the quantity of secret-keys to be provisioned for each of the key request.

According to examples of the present disclosure, the key requests in the key request queue may be sorted according to the level of each key request from high to low. Moreover, if a key request from an ONU changes, the key request queue then needs to be updated.

Before the above step 502, the following steps may also be performed.

After receiving at least one key request from the ONUs, the OLT may first check whether the QKD device deployed is idle, when the QKD device is idle, the OLT may mark the status of the QKD device as occupied and then proceed to step 502; and when the QKD device is not idle, informing the ONUs to wait until the QKD device is idle and then proceed to step 502.

Figure 6:
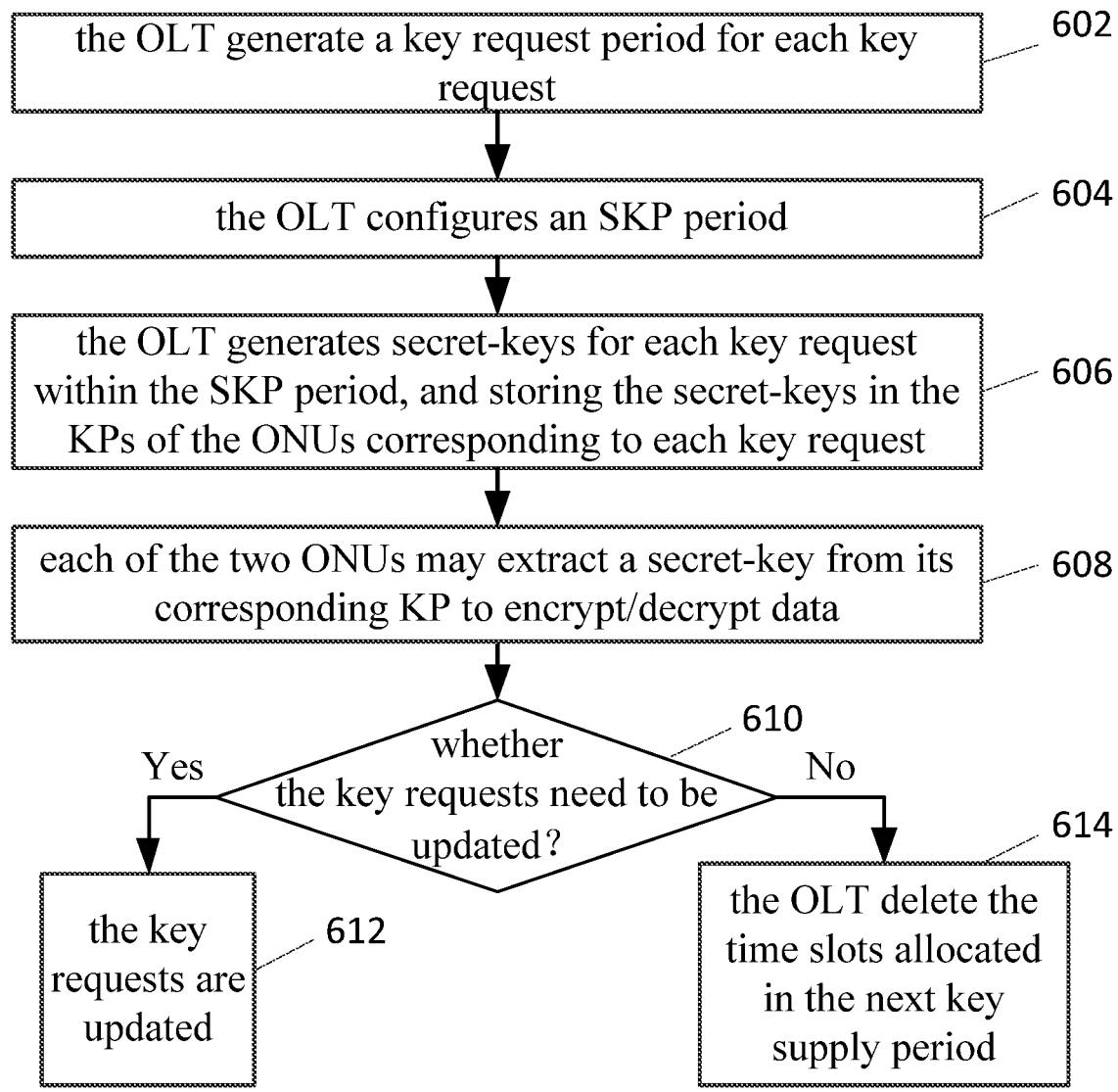
FIG. 6 is a flowchart illustrating the process of step 308 in the SKP method according to examples of the present disclosure.

FIG. 6 is a flowchart illustrating the process of step 308 in the SKP method according to examples of the present disclosure. As shown in FIG. 6, the process of step 308 may include:

In step 602, the OLT may check time slot resources which are idle, extract and divide the idle time slot resources according to the quantity of secret-keys to be provisioned, and generate a key request period for each key request.

According to examples of the present disclosure, in the above step, the OLT may check the quantity of secret-keys required by all the key requests from the ONUs. For two key requests with the high level that can form a bidirectional key request, the OLT may add the quantity of secret-keys required by the source node with the quantity of secret-keys required by the destination node and take the summation as the quantity of secret-keys required by these two key requests. Then the OLT may check the quantity of secret-keys that can be generated in one time slot and calculate the number of time slots required for each key request. The number of time slots required for each key request may be the ratio of the quantity of secret-keys required and the quantity of secret-keys that can be generated in one time slot. The OLT may then allocate time slots according to the number of time slots calculated for each key request. These time slots allocated may form a key request period of each key request.

In step 604, the OLT may configure an SKP period according to the key request queue and the key request period of each key request.

According to examples of the present disclosure, the order to allocate the time slots in the SKP period is the order of the key requests sorted by the OLT. Wherein, the key request period represents the number of time slots allocated to the corresponding key request in the SKP period. Then the OLT may send the allocation result of the time slots to all the ONUs respectively.

In step 606, the OLT may generate secret-keys for each key request within the SKP period, and storing the secret-keys generated in the KPs of the ONUs corresponding to each key request.

According to examples of the present disclosure, in each of the key request period in the SKP period, the OLT may first generate secret-keys between the OLT and the two ONUs according to the quantity of secret-keys required by the two ONUs. Then, a trusted/quantum relay at the OLT may perform an exclusive OR operation on the secret-keys generated between the OLT and the two ONUs to generate secret-keys between the two ONUs. Finally the OLT may store the generated secret-keys in KPs deployed at the two ONUs. According to examples of the present disclosure, the operation of secret-key generation may occupy both quantum channels and classical optical channels between the OLT and the ONUs.

After performing the above step 606, the SKP method is completed. According to examples of the present disclosure, after the above step 606, the following operations can be further performed:

In step 608, when a secure communication between two ONUs starts, each of the two ONUs may extract a secret-key from its corresponding KP to encrypt/decrypt data.

According to other examples of the present disclosure, the method of FIG. 6 may further include the following steps:

In step 610, the OLT may inquiry the ONUs whether the key requests need to be updated, when a key request need to be updated, proceed to step 612, and when there is no key request needs to be updated, proceed to step 614.

In step 612, an updated key request may be re-transmitted, and then proceed to step 401.

In step 614, the OLT may delete the allocation of the time slots in the next SKP period.

Figure 7:
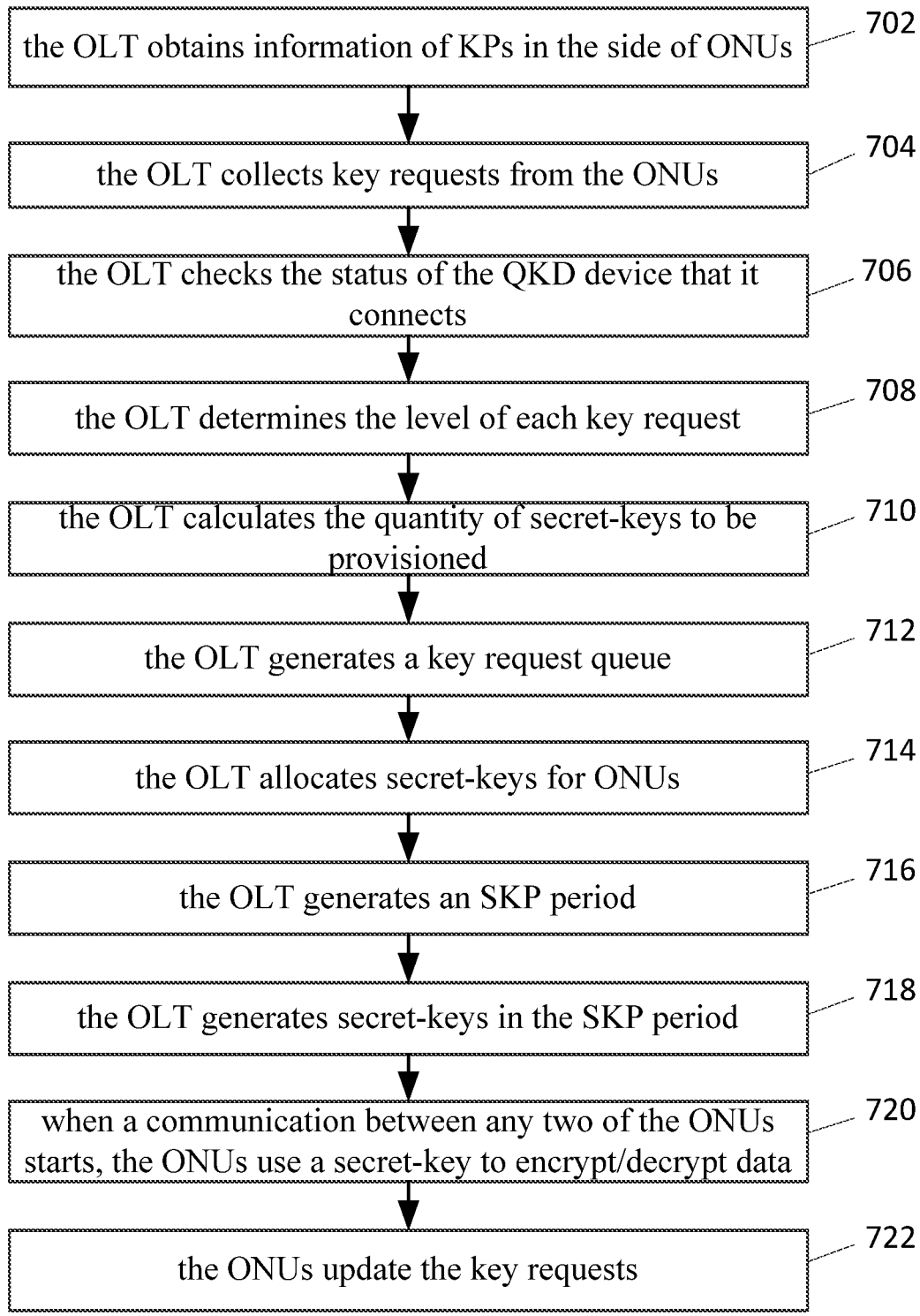
FIG. 7 is a flowchart illustrating the process of the SKP method according to some other examples of the present disclosure.

FIG. 7 is a flowchart illustrating the process of a SKP method according to some other examples of the present disclosure.

In step 702, the OLT obtains information of KPs deployed at the ONUs.

According to examples of the present disclosure, a KP is used for storing and managing secret-keys. Since different ONUs in the QAN may have different security requirements, to utilize secret-keys efficiently, each ONU may configure a KP with a size that matches its security requirements. Specifically, a KP may be a large-size KP, a medium-size KP or a small-size KP. According to examples of the present disclosure, parameters of a KP may include the capacity and the SKP threshold. Wherein, the SKP threshold may be used for an early warning on SKP. That is, when the quantity of secret-keys in the KP is less than the SKP threshold, it means that the quantity of secret-keys is not enough and an SKP is needed for the KP.

In step 704, the OLT collects key requests from the ONUs.

According to examples of the present disclosure, the OLT may broadcast to the ONUs at certain intervals to inquiry whether there is a key request. When the quantity of secret-keys in the KP of an ONU is less than the SKP threshold of the KP, the ONU may send a key request to the OLT to increase the quantity of secret-keys in its KP.

According to examples of the present disclosure, a key request may include the source node, the destination node, the quantity of secret-keys required, and the level of a user request corresponding to the key request. Wherein, the level of a user request may be a high level or a low level.

In step 706, the OLT checks the status of the QKD device that it connects.

According to examples of the present disclosure, the OLT may check whether the QKD device (a QKD transmitter or a QKD receiver) to which it connects is in an idle state. When the QKD device is in an idle state, the OLT may mark the status of the QKD device as occupied; and when the QKD device is not in an idle state, the OLT may notify all ONUs to wait until the QKD device is idle.

In step 708, the OLT determines the level of each key request.

According to examples of the present disclosure, in this step, the OLT may sort the key requests received from the ONUs. The OLT can obtain two types of information, i.e. the level of the user request corresponding to the key request and whether the user request can be paired with another user request. According to examples of the present disclosure, the level of a user request is indicated in the key request received. Whether the key request can be paired with another key request may be determined by determining whether there is another key request whose source node is the destination node of the key request and whose destination node is the source node of the key request. That is, if a key request can be paired with another key request, it means these two key requests form a bidirectional key request. If a key request cannot be paired with another key request, it means that this key request is a unidirectional key request.

According to examples of the present disclosure, the level of a key request may be one of the following: Level 1 (high level of user request, bidirectional), Level 2 (high level of user request, unidirectional), Level 3 (low level of user request, bidirectional), and Level 4 (low level of user request, unidirectional).

In step 710, the OLT calculates the quantity of secret-keys to be provisioned.

According to examples of the present disclosure, services with security requirements in QANs are mostly randomly requested, therefore, secret-keys in different KPs are also randomly consumed. According to examples of the present disclosure, a KP of an ONU may trigger a key request while the quantity of secret-keys in the KP is less than the SKP threshold. According to examples of the present disclosure, the OLT may obtain the quantity of secret-keys in each the KP by broadcasting an inquiry to the ONUs. The OLT may determine the quantity of secret-keys to be provisioned according to the difference between the quantity of secret-keys required by each KP and the quantity of secret-keys in each KP.

In step 712, the OLT generates a key request queue.

According to examples of the present disclosure, the OLT may first sort the key requests received from the ONUs according to the level of each key request from high to low. According to examples of the present disclosure, the OLT may generate a key request queue to store the key requests from the ONUs and the quantity of secret-keys to be provisioned for each of the key request. Moreover, if a key request from an ONU changes, the key request queue may need to be updated.

In step 714, the OLT allocates secret-keys for ONUs.

According to examples of the present disclosure, the OLT generates secret-keys by dividing time slot resources according to the key requests. According to examples of the present disclosure, in the above step, the OLT may check the quantity of secret-keys required in all the key requests from the ONUs. For two key requests with the high level that can be paired, the OLT may add the quantity of secret-keys required by the source node with the quantity of secret-keys required by the destination node and take the summation as the quantity of secret-keys required by both these two key requests. Then the OLT may check the quantity of secret-keys that can be generated in one time slot and calculates the number of time slots required for each key request. According to examples of the present disclosure, the number of time slots required for each key request may be the ratio of the quantity of secret-keys required and the quantity of secret-keys for each key request that can be generated in one time slot. The OLT may then allocate time slots according to the number of time slots calculated for each key request of each paired key requests. These time slots allocated may form a key request period of each key request.

In step 716, the OLT generates an SKP period.

According to examples of the present disclosure, the OLT sets an SKP period according to the level of each key request and the key request period of each ONU. According to examples of the present disclosure, the order to allocate the time slots in the SKP period is the order of the key requests in the key request queue sorted by the OLT. Wherein, the key request period represents the number of time slots allocated to the corresponding key request in the SKP period. Then the OLT may send the allocation result of the time slots to all the ONUs respectively.

In step 718, the OLT generates secret-keys in the SKP period.

According to examples of the present disclosure, in the key request period, the OLT may first generate secret-keys between the OLT and two ONUs according to the quantity of secret-keys required by the two ONUs. Then a trusted/ quantum relay at the OLT may perform an exclusive OR operation on the secret-keys generated between the OLT and the two ONUs to generate secret-keys between the two ONUs. Finally, the OLT may store the generated secret-keys in KPs at the two ONUs. According to examples of the present disclosure, the operation of secret-key generation may occupy the quantum channels and classical optical channels between the OLT and the ONUs.

In step 720, when a communication between any two of the ONUs starts, the ONUs use one of the secret-keys to encrypt/decrypt data.

According to examples of the present disclosure, after the process of SKP is completed, when a communication between any two of the ONUs starts, the source node (the source ONU) may take a secret-key from its KP to encrypt the data and the destination node (the destination ONU) may take the same secret-key from its KP to decrypt the data encrypted by the source node.

In step 722, the ONUs update of key request.

According to examples of the present disclosure, the OLT may broadcast a message to the ONUs to inquiry whether the ONU needs to update the key request. When the ONU needs to update the key request, return to 702. When the ONU needs not to update the key request, the OLT may delete the allocation of time slots in the next SKP period.

Based on the SKP method described above, an example of QKD in a QAN is disclosed below.

As shown in FIG. 2, a QKD receiver and a KP are configured at the OLT, and a QKD transmitter and a KP are configured at each ONU.

In step 1: the OLT records information of the KPs of three ONUs, wherein the size of each KP of the three ONUs is selected by the final user of the ONU.

In step 2: the OLT broadcasts to the three ONUs to inquiry whether there is a key request.

Since the quantity of secret-keys in the KPs of the three ONUs are all less than the SKP threshold, each of the three ONUs may send a key request to the OLT respectively.

In step 3: the OLT checks whether the QKD receiving device it connects is in an idle state.

Assuming that the QKD receiving device is in an idle state, secret-keys between the OLT and ONU1, ONU2, and ONU3 can be generated through the QKD receiving device and the QKD transmitting devices deployed at ONU1, ONU2, and ONU3.

In step 4: the OLT receives three key requests, namely a first key request which requests secret-keys for a service from ONU1 to ONU2 (the level of its corresponding user request is high), a second key request which requests secret-keys for a service from ONU2 to ONU1 (the level of its corresponding user request is high), and a third key request which requests secret-keys for a service from ONU3 to ONU1 (the level of its corresponding user request is low).

It can be seen that the first key request and the second key request can be paired with each other. Therefore, both the first key request and the second key request are of Level 1. The third key request is of Level 4.

In step 5: the OLT broadcasts to the three ONUs to collect the quantity of secret-keys required by the three key requests.

That is, the first key request needs 3 bits; the second key request needs 1 bit; and the third key request needs 4 bits.

In step 6: the OLT generates a key request queue to store the three key requests and the quantity of secret-keys required by the three key requests.

The key requests in the key request queue are sorted according to the level of each key request. That is, the order of the key requests in the in the key request queue is the first key request, the second key request and the third key request.

In step 7: the OLT adds the quantity of secret-keys required by the first key request and the second key request into 4 bits.

Assuming that, the secret-key generation rate is 2 bits per time slot, that is, 2 bits can be generated in one time slot, therefore, the first key request and the second key request need to occupy 2 time slots all together. The third key request needs to occupy 2 time slots. The four time slots are divided into two key request periods, respectively.

In step 8: the OLT may allocate time slots according to the order in the key request queue.

Figure 8:
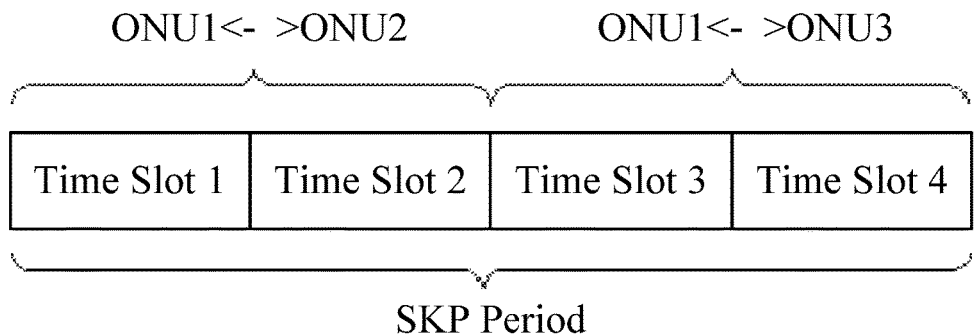
FIG. 8 is a schematic diagram illustrating the SKP period used in the SKP method in a QAN according examples of the present disclosure.

That is, the OLT may allocate the first 2 time slots to the first key request and the second key request and allocate the last 2 time slot to the third key request, as shown in FIG. 8.

In step 9: within the first two time slots, the QKD receiver at the OLT performs a QKD process with the QKD transmitters at ONU1 and ONU2, and within the next two time slots, the QKD receiver at the OLT performs a QKD process with the QKD transmitter at ONU3.

For example, for the first key request and the second key request between ONU1 and ONU2, within the first two time slots, a 4-bit secret-key between OLT and ONU1 may be generated, and a 4-bit secret-key between OLT and ONU2 may be generated too. Then the trusted/quantum relay performs an exclusive OR operation on the two 4-bit secret-keys to form a 4-bit secret-key between ONU1 and ONU2, which are stored in KPs at ONU1 and ONU2, respectively.

In step 10: when a secure communication is to be carried out between any two of ONU1, ONU2 and ONU3, the source node may take out a secret-key from its KP to encrypt the data, and the destination node may take our the same secret-key from its KP to decrypt the data encrypted by the source node.

In step 11: the OLT inquires whether any of the three ONUs needs to update the key request. If a key request needs to be updated, repeating the above steps 1-9; if there is no need to update any of the key request, the allocation of time slots in the next SKP period may be deleted.

Figure 9:
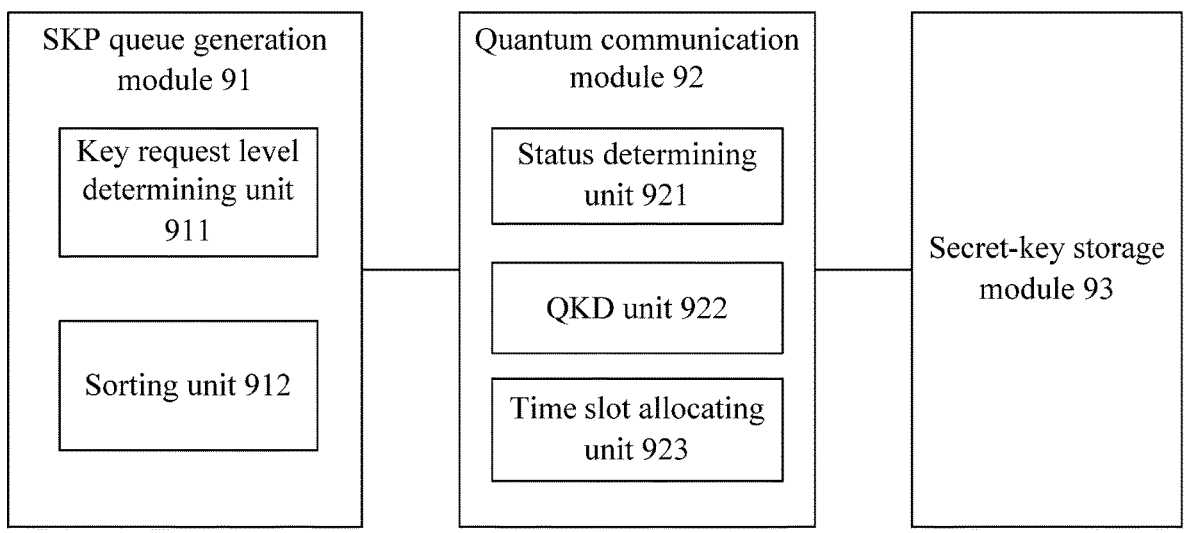
FIG. 9 is a schematic diagram illustrating the structure of an SKP device according to examples of the present disclosure.

Based on the SKP method described above, examples of the present disclosure also provide an SKP device whose structure is shown in FIG. 9. As shown in FIG. 9, the device may include:

an SKP queue generation module 91, configured to receive at least one key request and generate an SKP queue according to the at least one key request received;

a quantum communication module 92, configured to generate at least one secret-key according to the SKP queue; and a secret-key storage module 93, configured to store the at least one secret-key in KPs each of which corresponds to a final user for SKP.

According to some examples of the present disclosure, the SKP queue generation module 91 may include:

a key request level determining unit 911, configured to determine the level of each key request according to the level of a user request corresponding to the key request; and a sorting unit 912, configured to generate the key request queue by sorting the at least one key request according to the level of each key request.

According to some examples of the present disclosure, the quantum communication module 92 may include:

a status determining unit 921, configured to obtain the status of a QKD device, and mark the status of the QKD device as occupied when the device is idle, and wait when the device is not idle;

a QKD unit 922, configured to generate the at least one secret-key according to the SKP queue through the QKD device.

According to some examples of the present disclosure, the quantum communication module 92 may further include: a time slot allocating unit 923, configured to generate a key request period and configure an SKP period.

It should be noted that the secret-key storage module 93 described above stores the secret-key in the KP of each ONU for SKP, which realizes the inquiry of the quantity of secret-keys, the storage of secret-keys, the updating of secret-keys, the early warning on the quantity of secret-keys and the deletion of a secret-key after the secret-key is used.

According to examples of the present disclosure, the SKP device may further include a clock module, configured to provide accurate timing information for synchronization. The accurate timing information may be provided for the QKD devices and the SKP device through acquisition and calibration time information.

According to the method and device of SKP of the present disclosure, after receiving a plurality of key requests, a SKP queue is generated according to the level of each key request received. Then, secret-keys are generated according to the SKP queue, and stored in KPs configured in corresponding ONUs. Finally, data are encrypted/decrypted using the secret-key stored. Since the SKP queue is generated according to the level of each key request and secret-keys are generated according to the key request queue, not only a real-time secret-key generation can be realized, but also the requirements on security of ONUs can be met. Moreover, a flexible SKP in the QAN can be realized by matching the time slots in the QAN and the requirements on secret-keys of the ONUs.

Furthermore, according to the present disclosure, the SKP queue is obtained by sorting the key requests according to the level of each key request. Therefore, a key request with a higher level will have a higher priority of getting the secret-key, thus the efficiency of secret-key resources distribution can be improved.

Examples of the present disclosure also provide a device of SKP, which may include: one or more processors, one or more memories, and a communication bus configured to couple the one or more processors and the one or more memories; wherein the one or more memories store one or more instructions, and when executed by the one or more processors, the instructions cause the one or more processors to perform the above SKP method.

Examples of the present disclosure also provide a non-transitory computer-readable storage medium, including one or more instructions, when executed by one or more processors, cause the one or more processors to perform the above SKP method.

One of ordinary skill in the art will appreciate that: the discussion of any of the above examples is merely exemplary and is not intended to imply that the scope of the disclosure, including the claims, is limited to these examples. The above examples or technical features in different examples may also be combined under the idea of the disclosure, the steps may be implemented in any order, and there are many other variations of different aspects of the disclosure as described above, which are not provided in detail for the sake of brevity.

The present examples are intended to embrace all such alternatives, modifications and variances that fall within the broad scope of the appended claims. Therefore, it is intended that any omissions, modifications, equivalents, improvements and the like be included within the spirit and scope of the present invention.

What is claimed is:

1. A method of secret-key provisioning (SKP) implemented by a quantum key distribution (QKD) secured access network (QAN), wherein the QAN comprises an optical line terminal (OLT), a plurality of optical network units (ONUs), a QKD receiver arranged at the OLT, a QKD transmitter arranged at each of the ONUs, a relay arranged at the QKD receiver, and a key pool (KP) arranged at each ONU and the OLT, comprising:

receiving, by the OLT, key requests from the ONUs; wherein, each key request comprises: a source ONU of the key request, a destination ONU of the key request, quantity of secret-keys required, and level of a user request corresponding to the key request; wherein, the level of the user request comprises a high level and a low level;

determining, by the OLT, level of each key request according to the level of the user request corresponding to the key request and whether there is another key request whose source ONU is the destination ONU of the key request and whose destination ONU is the source ONU of the key request; wherein, determining the level of each key request comprises:

in response to determining the level of the user request corresponding to a first key request of the key requests is high level and there is a second key request who is high level and whose source ONU is the destination ONU of the first key request and whose destination ONU is the source ONU of the first key request, determining, by the OLT, levels of the first key request and the second key request are level 1, and forming, by the OLT, the first key request and the second key request as a key request pair;

in response to determining the level of the user request corresponding to a third key request of the key requests is high level and there is no key request whose source ONU is the destination ONU of the third key request and whose destination ONU is the source ONU of the third key request, determining, by the OLT, level of the third key request is level 2;

in response to determining the level of the user request corresponding to a fourth key request of the key requests is low level and there is a fifth key request whose source ONU is the destination ONU of the fourth key request and whose destination ONU is the source ONU of the fourth key request, determining, by the OLT, levels of the fourth key request and the fifth key request are level 3;

in response to determining the level of the user request corresponding to a sixth key request of the key requests is low level and there is no key request whose source ONU is the destination ONU of the sixth key request and whose destination ONU is the source ONU of the sixth key request, determining, by the OLT, level of the sixth key request is level 4;

obtaining, by the OLT, quantity of secret-keys to be provisioned for each key request according to the quantity of secret-keys required of the key request and quantity of secret-keys in the KP corresponding to the ONU which sends the key request;

generating, by the OLT, an SKP queue according to the level of each key request and the quantity of secret-keys to be provisioned for each key request; wherein, keys for the key requests in the SKP queue are generated in the order according to the level of each key request from high to low;

for each key request in the SKP queue according to a sequence of the SKP queue, generating, by the OLT, the QKD receiver, two QKD transmitters corresponding to the source ONU and the destination ONU of the key request and the quantum relay, at least one secret-key according to the quantity of secret-keys to be provisioned for the key request; and storing, by the OLT, the at least one secret-key in the KPs corresponding to the source ONU and the destination ONU;

in response to determining a secure communication between a source ONU and a destination ONU starts, taking, by the source ONU, a secret-key from the KP corresponding to the source ONU to encrypt the data; and taking, by the destination ONU, the secret-key from the KP corresponding to the destination ONU to decrypt the data encrypted.

2. The method of claim 1, wherein, obtaining, by the OLT, quantity of secret-keys to be provisioned for each key request according to the quantity of secret-keys required of the key request and quantity of secret-keys in the KP corresponding to the QKD transmitter of the ONU which sends the key request comprises:

determining, by the OLT, the quantity of secret-keys in the KP corresponding to the QKD transmitter of the ONU which sends the key request; and determining, by the OLT, the quantity of secret-keys to be provisioned for each key request as a difference between the quantity of secret-keys required and the quantity of secret-keys in the KP.

3. The method of claim 1, wherein, generating, by the OLT, the QKD receiver, two QKD transmitters corresponding to the source ONU and the destination ONU of the key request and the quantum relay, at least one secret-key according to the quantity of secret-keys to be provisioned for the key request comprises:

generating, by the OLT, a key request period for each key request according to the quantity of secret-keys to be generated;

configuring, by the OLT, an SKP period according to the SKP queue and the key request period of each key request, wherein the SKP period is a sum of all the key request periods in the SKP queue; and generating, by the QKD receiver, two QKD transmitters corresponding to the source ONU and the destination ONU of the key request and the quantum relay, at least one secret-key according to the quantity of secret-keys to be provisioned for the key request in the SKP period.

4. The method of claim 3, wherein, generating, by the OLT, a key request period for each key request according to the quantity of secret-keys to be provisioned comprises:

with respect to each key request pair, adding the quantity of secret-keys required by the two key requests of the key request pair and taking the summation as the quantity of secret-keys required by the key request pair;

determining, by the OLT, the quantity of secret-keys that can be generated in one time slot;

calculating, by the OLT, the quantity of time slots required by each key request according to the ratio of the quantity of secret-keys to be provisioned for each key request and the quantity of secret-keys that can be generated in one time slot; and generating, by the OLT, the key request period for each key request according to the quantity of time slots required by the key request.

5. The method of claim 3, wherein, configuring, by the OLT, a SKP period according to the SKP queue and the key request period of each key request comprises:

determining, by the OLT, the quantity of time slots required by all the key requests;

extracting, by the OLT, time slots according to the quantity determined;

dividing, by the OLT, the time slots exacted according to the order of the key requests in the key request queue and the key request period of each key request; and allocating, by the OLT, the time slots divided to each key request.

6. The method of claim 5, wherein, generating, by the QKD receiver, two QKD transmitters corresponding to the source ONU and the destination ONU of the key request and the quantum relay, at least one secret-key in the SKP period comprises:

in the time slots allocated to the key request, generating, by the QKD receiver, the two QKD transmitters corresponding to the source ONU and the destination ONU of the key request, secret-keys between the OLT and the source ONU and the destination ONU according to the quantity of secret-keys required by the source ONU; and performing, by the quantum relay, an exclusive OR operation on the secret-keys generated between the OLT and the source ONU and the destination ONU to generate secret-keys between the source ONU and the destination ONU.

7. The method of claim 1, further comprising:

inquiring, by the OLT, whether any key request needs to be updated;

when a key request needs to be updated, receiving, by the OLT, an updated key request; and when there is no key request needs to be updated, deleting, by the OLT, an allocation of the time slots in a next SKP period.

8. The method of claim 1, further comprising:

checking, by the ONU, the quantity of secret-keys in the KP after receiving a user request;

determining, by the ONU, to send the key request to the OLT when the quantity of secret-keys in the KP is less than an SKP threshold of the KP.

9. A non-transitory computer-readable storage medium, comprising one or more instructions, when executed by one or more processors, cause the one or more processors to perform the method according to claim 1.

10. A quantum key distribution (QKD) secured access network (QAN), comprising:

an optical line terminal (OLT);

a plurality of optical network units (ONUs);

a QKD receiver arranged at the OLT;

a QKD transmitter arranged at each of the ONUs;

a relay arranged at the QKD receiver; and a key pool (KP) arranged at each ONU and the OLT; wherein, the OLT is configured to receive key requests from the plurality of ONUs; wherein, each key request comprises:

a source ONU of the key request, a destination ONU of the key request, quantity of secret-keys required, and level of a user request corresponding to the key request; wherein, the level of the user request comprises a high level and a low level;

determining, by the OLT, level of each key request according to the level of the user request corresponding to the key request and whether there is another key request whose source ONU is the destination ONU of the key request and whose destination ONU is the source ONU of the key request; wherein, determining the level of each key request comprises:
in response to determining the level of the user request corresponding to a first key request of the key requests is high level and there is a second key request who is high level and whose source ONU is the destination ONU of the first key request and whose destination ONU is the source ONU of the first key request, determining, by the OLT, levels of the first key request and the second key request are level 1, and forming, by the OLT, the first key request and the second key request as a key request pair;
in response to determining the level of the user request corresponding to a third key request of the key requests is high level and there is no key request whose source ONU is the destination ONU of the third key request and whose destination ONU is the source ONU of the third key request, determining, by the OLT, level of the third key request is level 2;
in response to determining the level of the user request corresponding to a fourth key request of the key requests is low level and there is a fifth key request whose source ONU is the destination ONU of the fourth key request and whose destination ONU is the source ONU of the fourth key request, determining, by the OLT, levels of the fourth key request and the fifth key request are level 3;
in response to determining the level of the user request corresponding to a sixth key request of the key requests is low level and there is no key request whose source ONU is the destination ONU of the sixth key request and whose destination ONU is the source ONU of the sixth key request, determining, by the OLT, level of the sixth key request is level 4;
obtain quantity of secret-keys to be provisioned for each key request according to the quantity of secret-keys required of the key request and quantity of secret-keys in the KP corresponding to the ONU which sends the key request;
generate an SKP queue according to the level of each key request and the quantity of secret-keys to be provisioned for each key request; wherein, the key requests in the SKP queue are sorted according to the level of each key request from high to low;
the OLT, the QKD receiver, two QKD transmitters corresponding to the source ONU and the destination ONU of the key request and the quantum relay are configured to generate at least one secret-key for each key request in the SKP queue according to a sequence of the SKP queue and the quantity of secret-keys to be provisioned for each key request;
the OLT is further configured to store the at least one secret-key in the KPs corresponding to the source ONU and the destination ONU;
in response to determining a secure communication between a source ONU and a destination ONU starts, the source ONU is configured to take a secret-key from the KP corresponding to the source ONU to encrypt the data; and the destination ONU is configured to take the secret-key from the KP corresponding to the destination ONU to decrypt the data encrypted.

11. The QAN of claim 10, wherein, the OLT is further configured to determine for each key request the quantity of secret-keys in the KP corresponding to the ONU which sends the key request; and determine the quantity of secret-keys to be provisioned for each key request as a difference between the quantity of secret-keys required and the quantity of secret-keys in the KP.

12. The QAN of claim 10, wherein, the OLT is further configured to generate a key request period for each key request according to the quantity of secret-keys to be provisioned; configure an SKP period according to the SKP queue and the key request period of each key request; and
the QKD receiver, two QKD transmitters corresponding to the source ONU and the destination ONU of the key request and the quantum relay is configured to generate at least one secret-key according to the sequence of the SKP queue and the quantity of secret-keys to be provisioned for each key request in the SKP period.

13. The QAN of claim 10, wherein, the OLT is further configured to with respect to each key request pair, add the quantity of secret-keys required by the two key requests of the key request pair; take the summation as the quantity of secret-keys required by the key request pair; determine the quantity of secret-keys that can be generated in one time slot; calculate the quantity of time slots required by each key request according to the ratio of the quantity of secret-keys to be provisioned for each key request and the quantity of secret-keys that can be generated in one time slot; and generate a key request period for each key request according to the quantity of time slots required by the key request.

14. The QAN of claim 10, wherein, the OLT is further configured to determine the quantity of time slots required by all the key requests; extract time slots according to the quantity determined; divide the time slots exacted according to the order of the key requests in the key request queue and a key request period of each key request; and allocate the time slots divided to each key request.

15. The QAN of claim 10, wherein, in the time slots allocated to the key request, the QKD receiver and the two QKD transmitters corresponding to the source ONU and the destination ONU of the key request are configured to generate secret-keys between the OLT and the source ONU and the destination ONU according to the quantity of secret-keys required by the source ONU; and
the quantum relay is configured to perform an exclusive OR operation on the secret-keys generated between the OLT and the source ONU and the destination ONU to generate secret-keys between the source ONU and the destination ONU.

16. The QAN of claim 10, wherein, the OLT is further configured to inquire whether any key request needs to be updated; when a key request needs to be updated, receive an updated key request; and when there is no key request needs to be updated, delete an allocation of the time slots in a next SKP period.

17. The QAN of claim 10, wherein, each of the plurality of ONU is configured to check the quantity of secret-keys in the KP after receiving a user request; and determine to send the key request to the OLT when the quantity of secret-keys in the KP is less than an SKP threshold of the KP.

* * * * *